Dec. 21, 1943.　　　　R. D. HILL　　　　2,337,469
HOLDER FOR RENEWABLE FILTER UNITS
Filed April 2, 1940　　　3 Sheets-Sheet 1
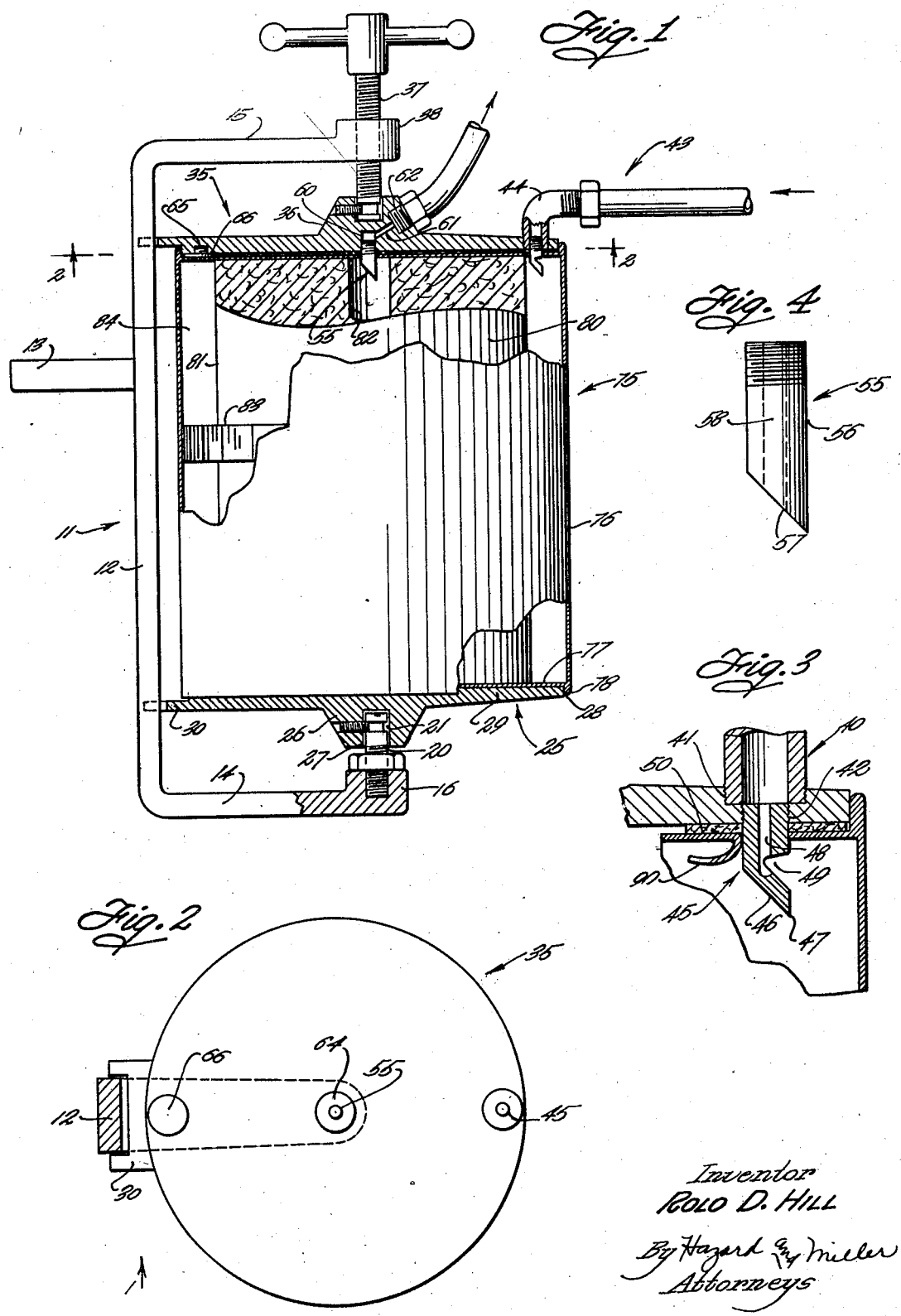

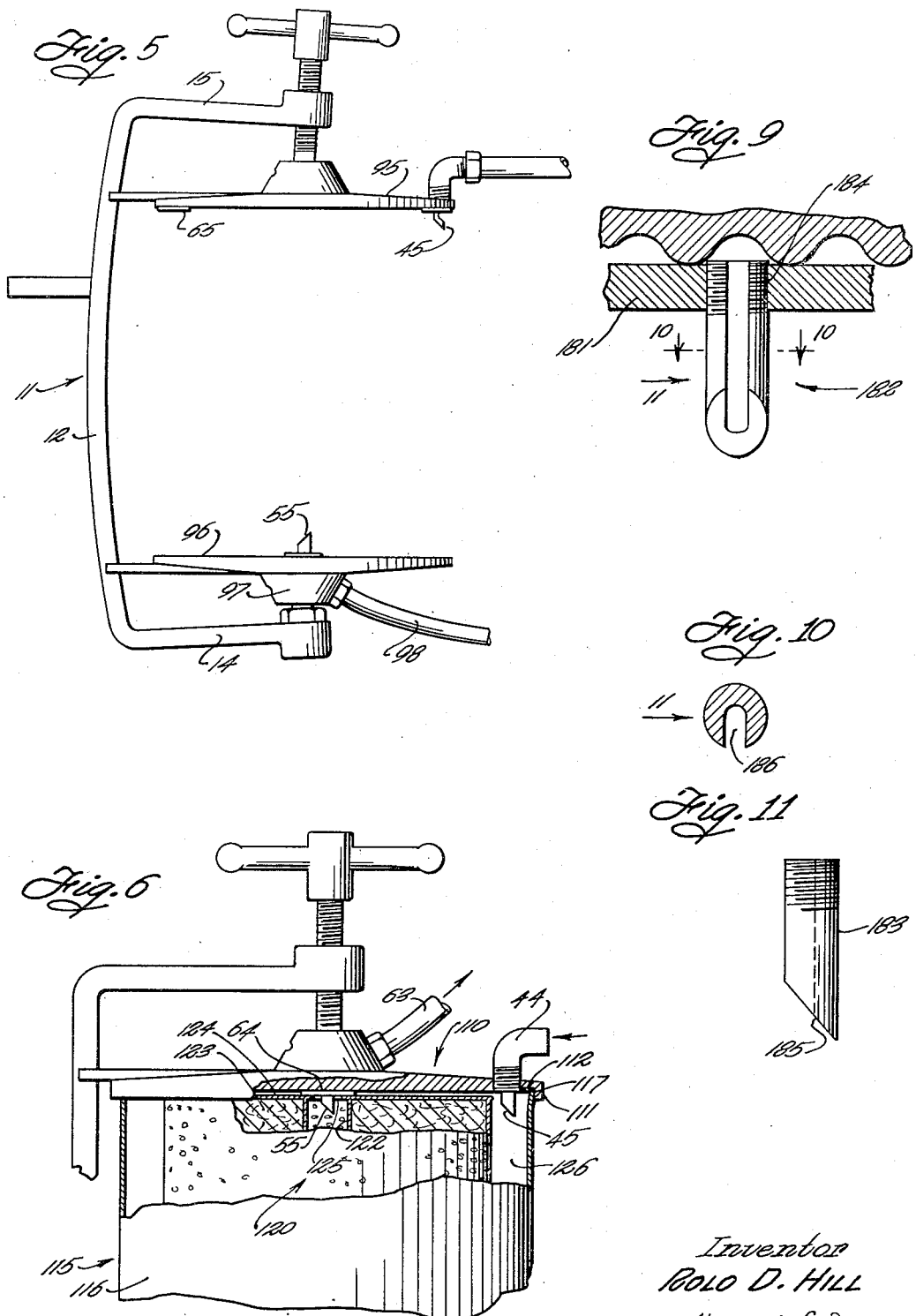

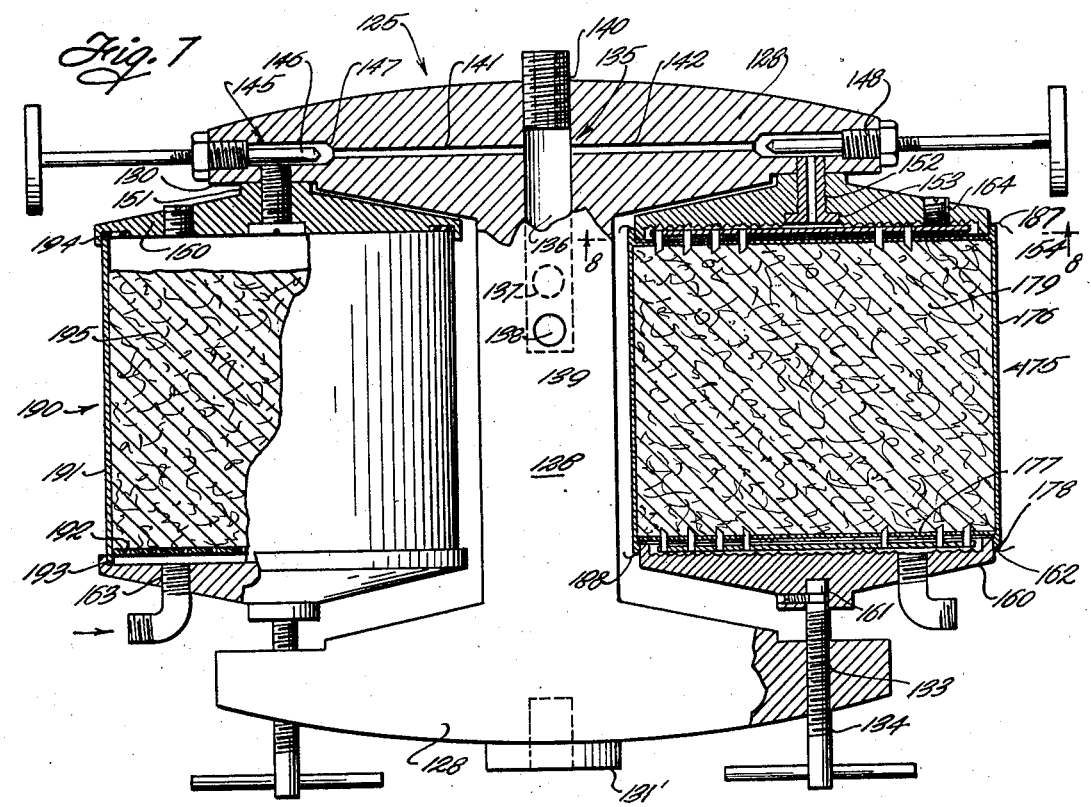

Patented Dec. 21, 1943

2,337,469

UNITED STATES PATENT OFFICE 2,337,469

HOLDER FOR RENEWABLE FILTER UNITS

Rolo D. Hill, Los Angeles, Calif.

Application April 2, 1940, Serial No. 327,489

2 Claims. (Cl. 210—112)

My invention pertains to an improvement in filtering equipment especially designed for use with filters made up in the form of replaceable units or either refillable units. In many of these types of filtering in which a filter medium or material is enclosed in a container or a unit, sometimes designated a cartridge, the necessary arrangement for connecting the flow pipes or conduits to force the fluid to be filtered through the unit or cartridge is so complicated that a considerable time is involved in changing the units, that is, the replacement of an exhausted or saturated unit with a new unit or carton for further operation. Moreover in many types of this equipment the changing is a somewhat messy and dirty job, also consuming considerable time in cleansing the unit or parts after removal of an exhausted unit and the replacement of a new unit. A main object and feature of my invention relates not only to the holder for the renewable filter units or cartridges but to certain improvements in the type of cartridge or container for the filtering material. Therefore in a type in which the filter unit is sealed in a container forming thus a sealed cartridge, an object and feature of my invention employs a holder or clamps with perforating elements which for instance may puncture one or both heads of a canister in which the filter medium is contained. These perforators or puncturing elements are preferably provided with ducts for the flow of the fluid to be filtered, both on the supply and the outlet for the clean fluid, therefore with my equipment a sealed cartridge mounted in the clamps and which has been used for filtering until contaminated, may be quickly removed by separating the clamps and thus withdrawing the perforators from the heads, removing the exhausted cartridge and replacing with a new sealed cartridge. Then on the clamps being brought together to hold the cartridge in position, there occurs the automatic perforating and the development of the ducts for leading the fluid to be treated in and out of the cartridge.

A further detail feature of my invention is adapting the holders and clamps for different types of cartridges or filter containers or canisters to provide for those which have a radial flow of the liquid as from the periphery to a central perforation in the filter unit or block as well as the type in which the liquid flows longitudinally through the filtering material, therefore the holders or clamps are provided with perforating pins having liquid ducts which for instance in connection with radial type of filtering may form a center perforation into the central aperture of the filter unit and a marginal perforation leading to the peripheral portion of the filter unit. With this construction if desired the two or more perforators may be located on one of the clamps such as the top clamp or one on the top and one on the bottom clamp.

In filtering other materials or making infusions from material contained in a canister, it is frequently desirable to have a relatively large number of perforations in order to provide for a thorough distribution of the liquid. In this case a plurality of perforating pins preferably each having a duct are mounted on the face of the two clamps and thus perforate opposite heads of the filter unit or cartridge for flow of the liquid therethrough. This type of equipment may readily be used either for filtering or for making an infusion from the material contained in the cartridge.

In view of the fact that it is also desirable to filter either through loose material contained in a suitable vessel or through prepared units having an open top, my invention includes equipment by which a vessel containing loose filtering material provides for a flow of the liquid through ducts or passages in the clamps and therefore through the material. In this case the bottom of the canister preferably has perforations and the top of the canister may be open. For filtering through prepared units in which openings are provided at the top, my invention having the perforators may be employed but in this case the perforators merely act as ducts with gaskets or the like operating as a sealing unit directing the flow of the liquid to and from the particular built up unit.

My invention is illustrated in connection with the accompanying drawings, in which:

Fig. 1 is a side elevation taken in the direction of the arrow 1 of Fig. 2 with parts broken away illustrating one form of the filtering pulsator assembly in which case the duct perforators are illustrated in the upper clamping plate for perforating the top head of a sealed cartridge, such cartridge being illustrated as of a composition block for a radial filtering operation.

Fig. 2 is a transverse section on the line 2—2 of Fig. 1 in the direction of the arrows, this being in effect an underside view of the upper clamping plate.

Fig. 3 is an enlarged vertical section similar to

Fig. 1 showing one of the duct perforators, this being in this instance a marginal perforator.

Fig. 4 is a partial elevation of another type of duct perforator such as shown in the center of Fig. 1.

Fig. 5 is a side elevation of a slight modification showing the same yoke as in Fig. 1 with the clamping plates having the duct perforators connected to the bottom and the top plate of the clamp.

Fig. 6 is a partial view similar to Fig. 1 showing the top portion only in which another type of filtering unit is engaged by the clamps, this being of an open top radial filtering type.

Fig. 7 is a side elevation partly broken away of another type of assembly in which the double yoke is provided with clamping plates for clamping two filtering units with provision for various directions of flow of the liquid. In this figure on the left hand side is illustrated a loose filtering medium retained in an open top vessel having a perforated bottom indicated as providing for upflow filtering. The right hand clamps illustrate upper and lower duct perforators in multiple to perforate and provide ducts through the top and bottom heads of a sealed vessel and providing for a downward flow, this type being used for filtering or making infusions.

Fig. 8 is a section on the line 8—8 of Fig. 7 showing the face of one of the clamping plates and a loose plate forming a holder for the duct perforators.

Fig. 9 is an enlarged section similar to Fig. 7 showing a face of one of the clamping plates, the plate supporting the duct perforators and one of the perforators.

Fig. 10 is a section on the line 10—10 of Fig. 9 through a slotted type of a pin perforator.

Fig. 11 is a side elevation of the same type of slotted perforator taken in the direction of the arrow 11 of Figs. 9 or 10.

Referring particularly to the construction shown in Figs. 1 through 6, a supporting yoke 11 is indicated as having a vertical web 12, a bracket 13 connected thereto which bracket is used to mount the yoke and the assembly on any desired structure, the yoke has lower and upper arms 14 and 15 formed integral therewith. The lower arm is provided with a boss 16 in which is seated a supporting pin 20. This pin is threaded into the boss secured by a lock nut and has a reduced neck 21. The bottom clamping plate 25 is indicated as having a boss 26 with a recess 27 somewhat larger than the upper end of the supporting pin 20 and is retained in place by a set screw engaging in the neck 21 of the pin. This allows a slight tilting action for a purpose hereunder detailed. In the type of clamping plate illustrated, this has a circular periphery 28 and is indicated as having a flat top face or surface 29. Fingers 30 extend from one side of the bottom portion of the plate and ride on opposite sides of the web 12 of the yoke, thus retaining such plate from rotation.

The upper clamping plate 35 is illustrated as having a boss 36 with a recess to receive the neck end of an adjusting screw 37, a set screw being used to engage the neck of the screw and thus provide for a slight tilting action of the clamping plate on the screw. The screw is threaded through the head 38 on the upper arm 15, there being a handle on the screw to enable tight clamping of the device. This plate is also illustrated as having a cylindrical periphery, a flat undersurface and fingers to straddle the web 12 of the yoke. With this type of mounting the plate has a perforator connector 40, this being illustrated, note Fig. 3, as a threaded intake recess 41 in the plate and a threaded perforation 42 in alignment therewith. A supply pipe indicated at 43 is shown as having an elbow 44 connected to the threaded recess 41. The tubular perforator pin 45 in this type is illustrated as circular in cross section having a beveled cutting face 46 providing sharp cutting edges 47. A duct 48 leads from the top of the pin but does not extend through the face 46, there being a lateral notch 49 for the lateral flow of liquid. A sealing gasket 50 is fitted around the perforator pin and retains close contact with the smooth undersurface of the upper clamping plate.

The type of perforator 55 illustrated at the center, is a cylindrical pin 56 threaded at one end and having a beveled face 57 at the opposite end providing sharp edges. In this case a central duct 58 extends through the face 57 for axial flow of the liquid. In this assembly there is a threaded recess 60 centrally located below the boss 56 and preferably in axial alignment with the clamping screw 37. A lateral duct 61 leads from this recess to a larger threaded recess 62 to which is connected a threaded outflow pipe 63 by the usual screw thread and clamping nut connection. A gasket 64 similar to 50 is fitted around the perforator pin 55. A pressure stud 65 is threaded into a recess in the underside of the upper pressure plate and this has a flat head 66 with a tight fit on the undersurface, this being to compensate for the thickness of the gasket 50 on the opposite perforator 45.

With this type of holder assembly I have illustrated in Fig. 1 a special type of cartridge which forms part of my invention, this being designated by the assembly numeral 75, which forms a canister having a cylindrical wall 76, lower and upper similar heads 77 connected by a peripheral bead 78. Within this I position and center a filtering block 80 which has an outer peripheral surface 81 and a central longitudinal opening 82. The block is held centered by a corrugated strap 83, thus leaving a peripheral space 84 for the supply liquid and for the accumulation of sediment. The block preferably fits snugly at its top and bottom on the inside of the top and bottom heads 77 of the canister. This type of canister and mounting for the block is designed to form a container for the filtering block described in my patent application for Oil filter block composition and method of making, Ser. No. 240,517, filed November 15, 1938, matured to Patent No. 2,247,377, issued July 1, 1941.

In utilizing the equipment above described, the yoke normally when there is no pressure, has the web with a slight bow as shown in Fig. 5, the yoke preferably being made of resilient steel such as spring steel however in Fig. 5 the arch of the bow is shown much exaggerated. The screw 37 is threaded upwardly thus leaving sufficient room to position and center a cartridge resting on the bottom plate 25. The plate and the container are so designed that the bead 78 has a comparatively snug fit on the circular periphery 28 of the bottom plate and there is a surface contact of the upper face 29 of the bottom plate and the lower head. The screw 27 is then threaded downwardly, care being taken to position the perforating pins 45 at the side and 55 in the center so that the upper head of the canister will fit snugly on the underface of the upper plate 35, the top bead fitting outside of the periphery of such top plate. As the screw is threaded downwardly, manifestly the cutting edges of the pins 45 or 55 puncture and cut through the top head. This causes the portion cut to curl sidewise as indicated at 90, Fig. 3. The portion which curls back does not break off but remains attached at one side to the top head, however it leaves a clean cut, thus providing a substantially cylindrical aperture for the cylindrical pins 45 or 55. A continued downward clamping brings pressure between the gaskets 50 for the marginal perforator 64 of the center perforator and pressure of the head 66 of the stud 65 in the opposite side. This pressure may be increased to the desired extent until it is assured that there is no chance of leakage at the gaskets 50 or 64, that is, at the marginal or center perforators. This action of bringing pressure on the heads of the container slightly displaces the bowed in arms 14 and 15 of the yoke and on account of the resiliency of the yoke, there is thus developed a resilient or spring pressure constantly operating on the gaskets so that should these gaskets tend to leak or become compressed, there is always a take up to maintain a tight seal at the perforators, hence with this construction there is no danger of a by-pass of the liquid to be filtered from one perforator to another.

In this type of filtering the inflow is shown through the supply pipe 43 and the elbow 44 in the direction of the arrow illustrated in Fig. 1. This liquid fills in the annular space 84 surrounding the periphery of the filtering block. The liquid is forced through the block to the central perforation 82 which extends from the top to the bottom and thence out through the perforator 55 and the outlet pipe 63 in the direction of the arrow illustrated. This type is shown as particularly adapted for a unit or cartridge for filtering the lubricating oil or cylinder oil of an internal combustion engine. Manifestly it is quite a simple operation when the block has become so saturated with sediment that it is desirable to replace the unit. In this replacement operation it is not necessary to disconnect the pipes from the upper head as these are usually of flexible material such as copper tubing. The screw 37 is merely threaded upwardly thus elevating the upper clamp and removing the perforators from the top head of the canister, at the same time lifting the gaskets 50. Due to the fact that the clamping of the unit slightly compresses the filter block, the release allows this to expand slightly, therefore any oil which drops or may have possibly spread to the top of the cartridge is sucked inwardly through the perforations made by the perforators, thus there is practically no chance of spilling oil from the container in removing this provided it is lifted out from the two clamps without turning the same upside down. In view of the fact that the canisters being merely a type of the conventional tin can are quite inexpensive, they add but little to the cost of the filter unit and in fact maintain the filter blocks in a clean condition without contamination for replacements.

As above mentioned, Fig. 5 is a modification of the construction above described in connection with Fig. 1 illustrating in this case the top plate 95 as having no center perforation pin such as 55 and thus the boss on the plate has no pipe connection, this plate therefore being provided only with a perforator similar to 55 and the pressure stud 65 diametrically opposite. The bottom plate 96 has a single perforator similar to 55 centrally positioned and the boss 97 on the bottom is provided with an outlet pipe connection 98. In using a construction with a bottom perforator of course it is necessary to exercise care in properly centering the canister or cartridge so that the perforator 55 will properly enter the central opening in the filter unit.

Fig. 6 shows a slight modification in the style of the pressure plates using the same type of yoke. In this instance the top and bottom pressure plates 110 are preferably provided with a circular rim or flange 111 and at the top a gasket 112 is fitted adjacent the rim. This is illustrated as having marginal perforators such as 45 and a center perforator such as 55 but with the particular type of container used these merely function as liquid ducts, not being required to perforate through any metal. The type of cartridge indicated at 115 has usually a cylindrical shell 116, a flat bottom not shown and an upper edge 117 which fits against the gasket 112. The container is thus open at the top. The filter unit 120 is usually made up with a perforated cylinder 121, a central perforated tube 122 and a packing of filtering material 123 therebetween. These perforated walls have lower and upper heads, the upper head only being illustrated at 124 and having an opening 125 therethrough connecting to the center of the core tube 122. Therefore when this type of cartridge is centered on the lower plate not illustrated and the upper plate is clamped downwardly, the side perforator 45 enters the annular space 126 between the wall 116 of the canister and the perforated cylinder 121. The center perforator 55 enters the core tube 122, the downward pressure bringing the gasket 64 to a liquid tight seal with the head 124 of the filter unit. The intake is indicated as through the elbow 44 and the outlet through the tube 63. This causes the circulation of the liquid to be filtered from the peripheral space 126 through the perforations in the cylinder 122 more or less radially through the packing or filtering material 123 and through the perforated central core 122 to the center space and thence out through the perforator 55 and the outlet tube 63. Also in this case there is a slight space between the head 124 and the underside of the upper pressure plate. There is no passage of the liquid due to the gasket 64 of the filtered liquid from the center core to this space. It will therefore be seen that with this type of cartridge and using this conventional type of built up filter unit that these can be readily inserted and removed and then replaced by a fresh unit in the same manner as described in connection with Fig. 1 except that no actual perforation is necessary. In some cases however in order to maintain the filter unit uncontaminated, a metal head is attached to the upper edge of the cartridge 115 being beaded or otherwise secured to the shell 116. In this case the perforators have their obvious function.

In the construction of Fig. 7 I illustrate an assembly especially designed for up and down flow of the liquid so that in one unit a liquid may be filtered and then transferred to the other unit having a downward flow through the packing, this type being eminently suitable for making an infusion such as of coffee or the like providing for this purpose a filtering of the water through the filter pack. In this construction I employ a double yoke 127 which may be considered as having a central web 128, a lower pair of arms 129 and an upper pair of arms 130. A threaded boss 131 at the bottom is utilized to mount the device on a pedestal or any suitable stand. The arms each have a flat or plane surface 132, this being on the outer ends on the underside of the upper arms and the upper side of the lower arms. The lower arms are screw threaded at 133 to accommodate the clamping screws 134.

In this construction the upper arm provides the passages and ducts indicated by the assembly numeral 135 for the transverse flow of liquid and the control thereof, the illustration showing a central bore 136 having two opposite outlet connections 137 and 138, these being indicated as threaded openings having closure plugs 139, these openings being suitable for connection of pipes or control cocks or faucets. The bore is closed by a plug 140 at the top. Two lateral ducts 141 and 142 lead respectively to a needle valve assembly 145 in which the needle or pin 146 may seat against a valve seat 147. The needle is threaded in a bushing 148 and controlled by the stem and finger grip knob in the usual manner. In this construction the general characteristics of the clamping heads are the same, for instance the upper plate 150 has a central boss 151 to bear snugly against the flat undersurface 130 of the upper arms and is held clamped to such upper arm by a tubular bolt 152, such bolt having a head 153 seating in a recess in the upper head. These heads are characterized by a peripheral flange or rim 154 which may be provided with a gasket receiving annular recess. Thus the tubular bolts form a liquid passage to the needle valve assemblies and thence to the ducts 141 and 142. In this construction as it is intended that there be no yield to the yoke or the arms thereof, the upper heads are bolted tightly in position. The lower heads 160 have the neck and pin connection 161 to the upper end of the clamping screws 132 with a sufficient loose connection to provide for slight tilting of such heads. These heads are likewise illustrated as having an upwardly flanged rim as at 162. They are provided with threaded apertures 163 for pipe fittings hereunder detailed. The upper heads are likewise provided with threaded perforations 164 indicated as being closed with plugs. These however provide for a connection of pipe fittings.

As in the construction illustrated in Fig. 8, the fluid connections are through the upper and lower clamping plates for distribution or spreading, it is desirable to have the plate provided with the working face of the plate indicated at 170 as having radial grooves 171 and also a series of concentric corrugations 172. In the right hand side of Fig. 7, I show a closed container 175, this being provided with a cylindrical wall 176, upper and lower heads 177 with a beaded connection 178 with the side wall 176. This contains packed material indicated at 179 which may be filtering material or a preparation for making an infusion, such as ground coffee or the like packed in the conventional vacuum sealed canister. This construction therefore fits snugly with the bead fitting over the annular flange rim 162 of the bottom plate or 154 of the top plate. There is thus left a space between the respective faces of the pressure plates and the heads of the canister, thereby providing for a distribution of the fluid.

With this type of assembly it is desirable to have the perforators separately mounted instead of attached rigidly to the pressure plates. In this case the perforator assembly designated 180, note particularly Figs. 7, 8, 9, 10 and 11, employs a metal disk 181, this being in the form of a flat plate and has perforators 182 connected to such plate. These perforators are illustrated as having a cylindrical wall 183, a threaded upper portion 184 threaded into the plate 181 and having a beveled cutting edge 185, such end having sharp cutting edges similar to the perforator of Fig. 1. In this case the perforating pin has a longitudinal groove or slot 186. This is shown as being on the short side of the pin, that is, it passes through the upper part of the bevel end 185 instead of the puncturing point end. As this groove extends the full length of the pin and through the plate or disk 181, it forms a passage for transference of fluid. When using this type of construction especially as it is desired to make an infusion such as of coffee, it is desirable to employ a filter paper indicated at 187 between the perforator plate and the upper head of the canister and a filter paper 188 between the lower head of the canister and the lower perforator plate. In reality this is only required to form a leak proof joint between the rims 154 and 162 and the respective heads of the canister, however in most cases the close fit and pressure is sufficient to prevent leakage. The paper acts as a filter where infusion is made.

In using the perforator on a separate plate or disk, the usual practice is to lower the lower pressure plate by means of the adjusting screw 132, fit the lower perforator disk with its perforators in position on the face of this plate, center the canister with the lower head on the perforating pins, then place the upper perforating pins on the upper head of the canister, the points of the perforators in both cases contacting the heads of the canister. The screw 132 is then threaded upwardly establishing the pressure between the lower and upper pressure plates, the perforator pins and the heads of the canister to cause a perforation of these and then establish the sealed tight joint. The flow of liquid thence through the passages in the pressure plates and the perforators then establishes a flow through the material in the canister which as above mentioned, if this should be coffee or similar food material, produces an infusion.

Although my invention above described applies to filtering in which the containers are perforated by perforator pins or the like having ducts for the fluid to be utilized, it will be nevertheless understood that my invention can readily be applied to perforated containers in which the filtering material may be in the form of a somewhat loose pack. Such construction is illustrated on the left hand side of Fig. 7 in which the container 190 is shown as a vessel with a cylindrical wall 191, a perforated base 192 and a bead 193 which fits within the annular rim 162. The top of the container shown as open, the upper peripheral edge 194 fitting against the gasket on the lower face of the upper pressure plate. The faces of these plates may be corrugated and have radial grooves as shown in Fig. 8 or flat surfaces. In this case the filtering material indicated at 195 is shown as loose in the container.

The structure of Fig. 7 may be utilized as follows: for instance, the intake of water may be through the lower plate of the left hand assembly and thus directing a flow upwardly through the loose packed material 195, thence through the needle valve 145, thence flowing transversely through the connecting duct 141 and downwardly through the canister 175 having the perforating pins. For instance presuming the material in the canister 175 is packed coffee, hot water may be first filtered by flowing upwardly through the filter 190 and thence downwardly through the packed coffee, making a coffee infusion or if desired, the use of the filter 190 may be omitted, the needle valve thereabove closed and boiling water charged through one of the plug openings 137 or 139 and thence downwardly through the container 175. It is obvious that depending on the liquids to be filtered and the filter materials, that variations may be made in the direction of flow of the liquid and in the filter medium utilized.

Various changes may be made in the details of the construction without departing from the spirit or scope of the invention as defined by the appended claims.

I claim:

1. A filter assembly comprising a cylindrical canister having a hollow cylindrical filtering medium therein the sides of which are in spaced relation to the cylindrical walls of the canister and the ends of which engage the end walls of the canister, and a holder for the canister having plates arranged to overlie and be engageable with the end walls of the canister, means for forcing the plates into engagement with the end walls of the canister, hollow piercing means on one of the plates, one of the piercing means being arranged to pierce the canister opposite the hollow interior of the filtering medium and the other being arranged to pierce the canister opposite the space between the filtering medium and the cylindrical walls of the canister, and means providing conduits connected to the piercing means.

2. A filter assembly comprising a cylindrical canister having a hollow cylindrical filtering medium therein the sides of which are in spaced relation to the cylindrical walls of the canister and the ends of which engage the end walls of the canister, a holder for the canister having plates arranged to overlie and be engageable with the end walls of the canister, means for forcing the plates into engagement with the end walls of the canister, hollow piercing means on one of the plates, one of the piercing means being arranged to pierce the canister opposite the hollow interior of the filtering medium and the other being arranged to pierce the canister opposite the space between the filtering medium and the cylindrical walls of the canister, and means providing conduits connected to the piercing means, there being gaskets around the piercing means and a stud of equal thickness to the gaskets arranged on the plate bearing the piercing means diametrically opposite the piercing means that is arranged to pierce the canister opposite the space between the filtering medium and the cylindrical walls of the canister.

ROLO D. HILL.